Patented Jan. 10, 1939

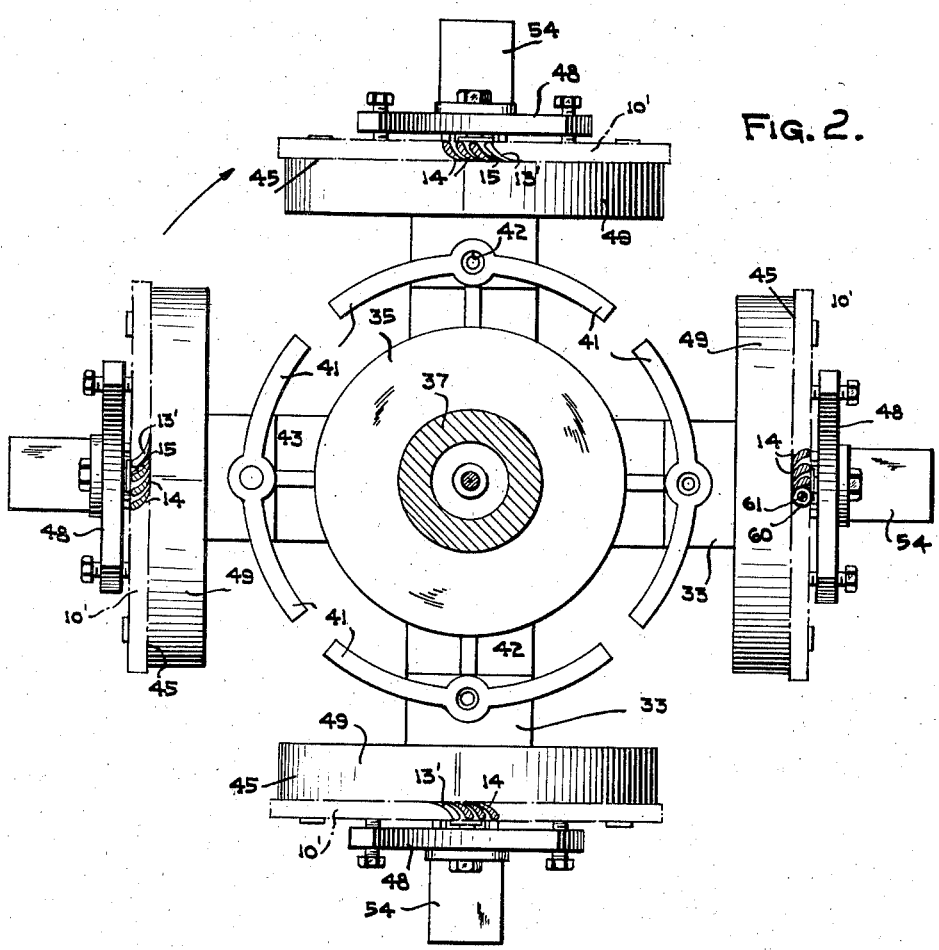

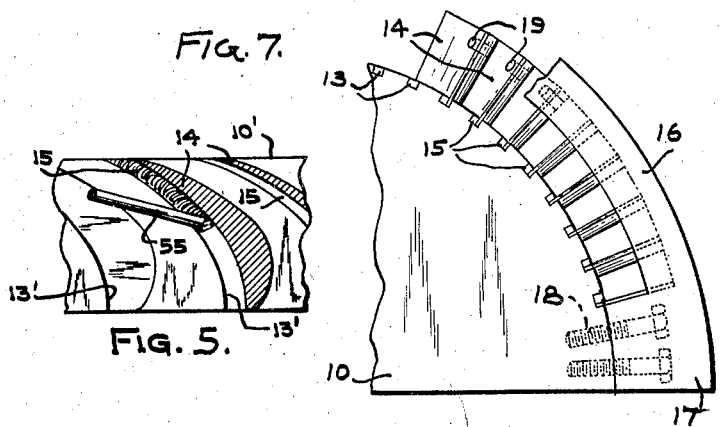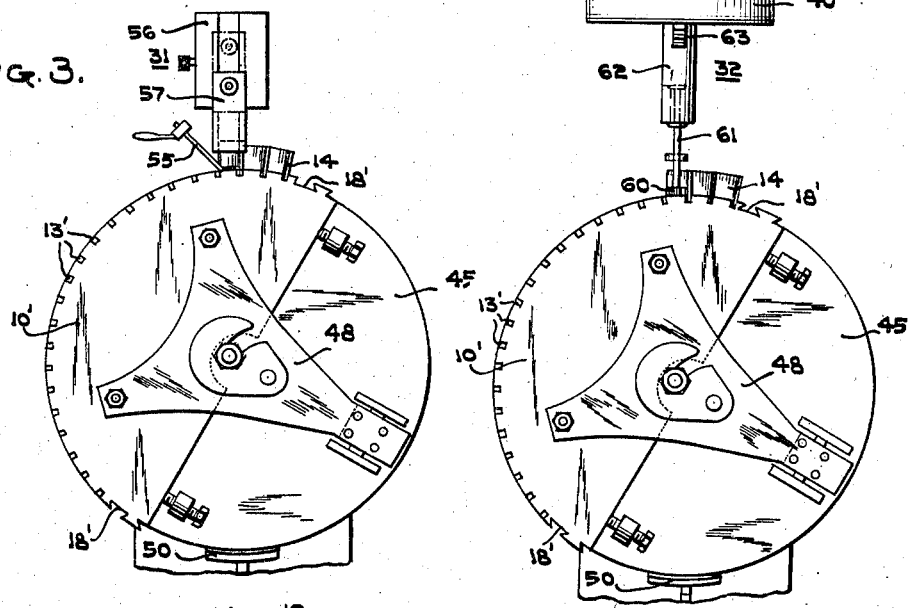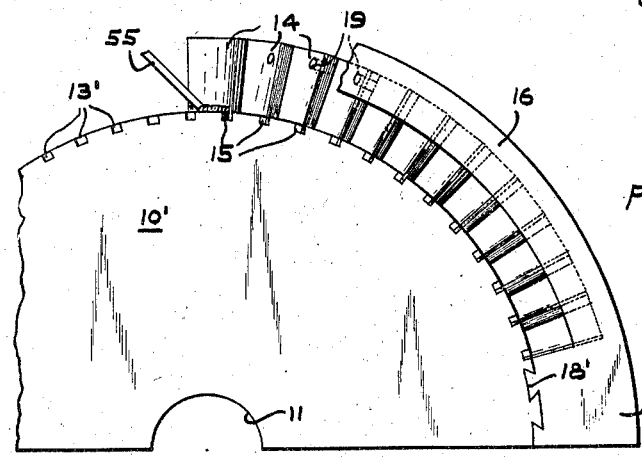

2,143,463

UNITED STATES PATENT OFFICE 2,143,463

APPARATUS FOR ATTACHING TURBINE BLADES

Arthur R. Allard, Drexel Hill, Pa., assignor to Westinghouse Electric & Manufacturing Company, East Pittsburgh, Pa., a corporation of Pennsylvania Original application July 30, 1936, Serial No. 93,514. Divided and this application December 22, 1937, Serial No. 181,088

14 Claims. (Cl. 29—23.5)

This application is a division of my application, Serial No. 93,514 filed July 30, 1936, and it relates to the manufacture of diaphragm for elastic-fluid turbines and it has for an object to provide apparatus facilitating the attachment of vanes to diaphragm members.

In accordance with the present invention, a plurality of diaphragm disk members are mounted on work holders movable in a circuit so that the disk members may be brought successively to vane-fastening location or locations in the circuit and each of the work holders is adjustable about its axis to position properly the disk member carried thereby for blade attachment. A further object of my invention is to provide apparatus having these features of construction and of operation.

A further object of my invention is to provide improved apparatus for the manufacture of turbine diaphragms wherein a plurality of diaphragm plates having peripheral slots are carried by work holders, the arrangement and operation being such that vane sections are welded in the slots of the plate members, the vane sections being welded, one at a time, to the plate members in succession.

A further object of my invention is to provide apparatus for the manufacture of turbine diaphragms wherein a circumferential series of work holders carrying diaphragm plate members are each brought successively into a first position where a vane element is welded to a plate member and to a second position where excess weld metal is removed.

These and other objects are effected by my invention as will be apparent from the following description and claims taken in connection with the accompanying drawings forming a part of this application, in which:

Fig. 2 is a horizontal sectional view taken along the line II—II of Fig. 1 and viewed in the direction of the arrows;

Fig. 3 is a partial elevational view of the machine as seen from the left in Fig. 1 and showing the "first position" in which the vanes or blades are welded to the disk member;

Fig. 4 is a view similar to that of Fig. 3 and as seen from the right of Fig. 1 and showing the "third position" in which a milling cutter is used to remove excess weld metal;

Fig. 5 is an enlarged fragmentary view showing a vane being welded to a plate member;

Fig. 6 is a side elevational view of a completed diaphragm member with parts broken away; and, Fig. 7 is a fragmentary view showing an alternative connection of the outer ring member to the plate or disk member.

Figure 1:
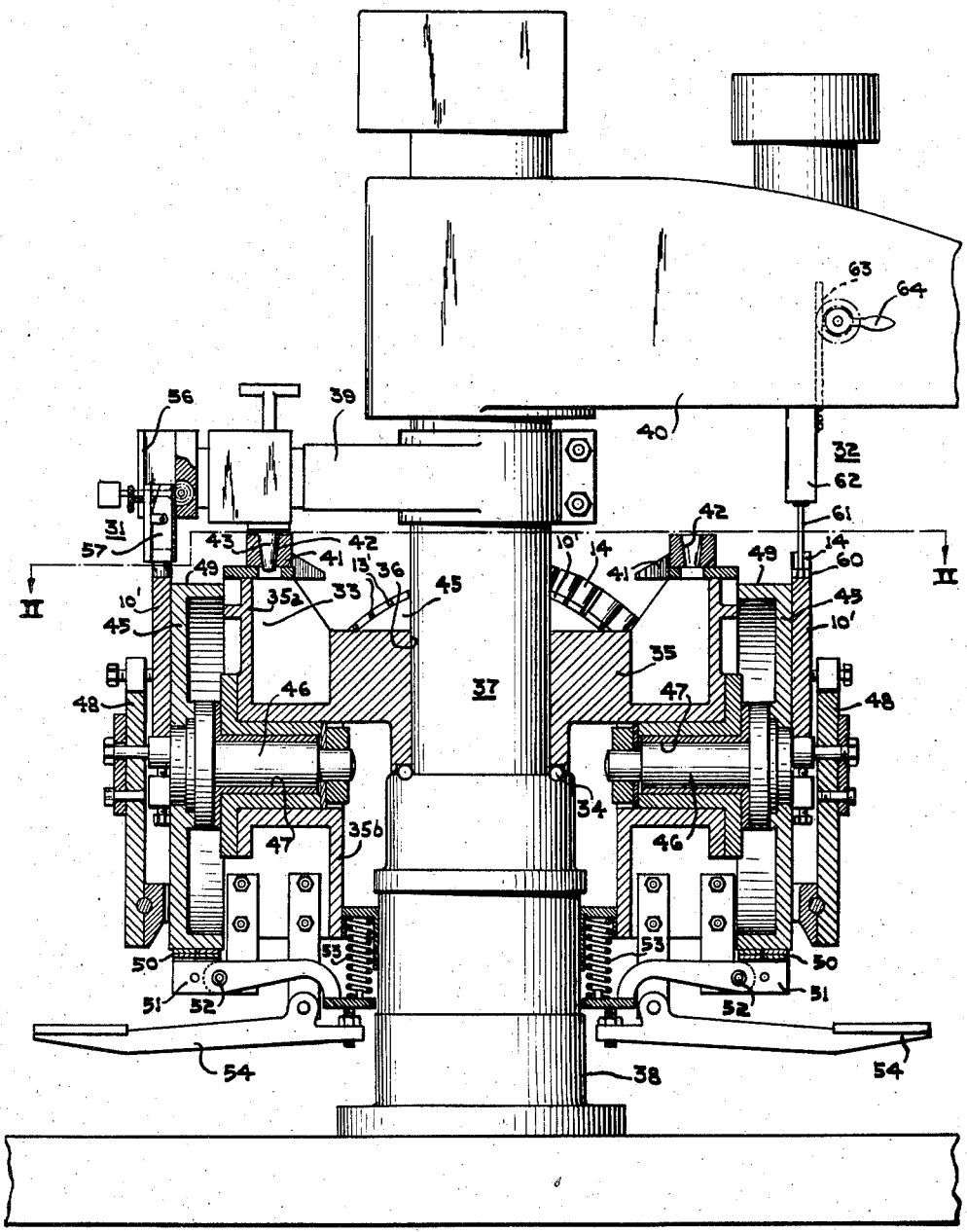
Fig. 1 is a vertical sectional view of the machine providing for attachment of vanes to disk members.

Referring now to the drawings more in detail, there is shown a disk member 10', of a semicircular form, having a central recess 11 to provide for the spindle opening in the completed diaphragm consisting of a pair of complementary disk members.

Each of the disk members 10' is provided with peripheral and transverse grooves 13' shaped so that one wall thereof is conjugate to one surface of a vane and the other wall is spaced sufficiently from the opposite vane surface or constructed to provide a channel or recess for the reception of weld metal. As shown, the vane or blade elements 14 have convex and concave faces; and, while either groove wall may be conjugate to one of the vane faces, I prefer to have the concave groove walls made conjugate to convex faces of the vanes so that, with a vane positioned in the groove with its convex face fitting the concave groove wall, a recess or channel is left for welding at the concave side or face of the vane, this being particularly advantageous in that removal of excess weld metal may be more conveniently effected at the concave side.

The blades or vanes 14 are welded in the grooves 13' of the disk member 10' one by one beginning with the right hand end of the row as seen in Figs. 3, 4 and 5. With a blade 14 properly positioned in the first groove 13' so that its convex side abuts the concave side of the groove, welding occurs at the concave side of the vane. A welding rod 55 is insertable in the recess formed by the remaining portion of the groove not occupied by the vane end. The recess is filled with weld metal 15, which forms an autogeneous connection of the concave blade or vane side and the disk member, the weld metal not only completely filling the recess but also firmly bracing the inner end of the blade or vane in position. Surplus weld metal is removed in any suitable manner, as by cutting or grinding, to provide a smooth, finished top surface of the weld approximately reforming the peripheral surface of the disk member.

After removing excess metal of a weld, a vane is inserted in the next slot and welded, followed by machining, the vanes being attached successively from the right to the left in Figs. 3, 4 and 5 and welding and machining occurring at the forward side in the direction of assembly on account of the space required for these operations.

After the vanes 14 of a disk member 10' are welded thereto, an outer ring 16 (see Fig. 6) is then cast to the outer ends of the blades. When the blade row does not extend fully to the line of division between the two halves of the diaphragm, the outer ring is preferably extended to and directly cast on to the periphery of the disk member 10, beyond the ends of the blade row, as shown at 17' in Fig. 6 and at 17 in Fig. 7. Any suitable means of attachment of the end portions 17' or 17 may be adopted. In Fig. 6 the portions 17' have dovetails 18' cast into dovetailed slots of the disk member, while, in Fig. 7, the end portions 17 are connected by bolts 18 to the disk member. The outer ends of the vanes are preferably provided with openings 19 to secure better anchorage of the cast ring to the outer vane ends.

The vanes are assembled one at a time on a plurality of diaphragm members in succession. To this end, there is provided a circumferential group of work holders arranged in relation to the vane assembly and welding locations and a cutting or trimming location such that, when one diaphragm member is properly located with respect to the assembling and welding location, another will be preferably placed at the machining location, whereby operations of welding, cooling, machining and finishing may take place and concurrently at different locations.

More particularly, in the drawings, there is shown a blade holder, at 31, and a milling cutter, at 32, together with a group of equidistantly spaced work holders 33 movable so that, when one is in proper relation with respect to a blade holder, at 31, another will be in proper relation with respect to the cutter, at 32.

As shown, the work holders 33 are carried by a turntable or cage 35 having a central bearing 36 engaging the spindle 37 provided on the center post 38, the turntable having upwardly and downwardly extending flanges 35a and 35b. Above the spindle, radial arms 39 and 40 are connected to the center post and carry, at their outer ends, respectively, the blade holder, at 31, and the cutter, at 32.

The blade holder, at 31, and the cutter, at 32, are spaced apart in relation to the spacing of the work holders 33 so that, with one work holder in proper relation to the blade holder another will be in proper relation to the cutter. Therefore, the turntable is provided with an indexing ring 41 carried by the flange 35a and provided with a tapered opening 42 for each work holder and a tapered pin 43 carried by the arm 39 cooperates with the openings 42.

While the indexing device assures of predetermined relations of the turntable with respect to the blade holder and the cutter, it is necessary to provide for angular adjustment of each work holder with respect to the turntable in order that the diaphragm grooves may each be brought into proper relation with respect to the blade holder, adjustment relatively to the turntable to secure the proper location for blade assembly and welding also assuring proper location for removal of excess weld metal.

Each of the work holders is preferably comprised by a face plate 45 carried by an arbor 46 fitting a bearing 47 provided in the flange 35b of the turntable 35. Each face plate 45 is provided with a clamping device 48 so as to hold a diaphragm member 10' in proper position with relation thereto. Also, the face plate has a brake drum 49 and a cooperating brake shoe 50 carried by one end of a lever 51, pivoted on the fulcrum pin 52 carried by the flange 35b and having the force of the spring 53 exerted on the other end thereof in such manner that the spring force normally tends to engage the brake shoe with the brake drum. The brake is released by means of a treadle 54, also covered by the flange 35b and which serves to relieve the spring force and to raise one end of the lever 51.

Assuming that each of the work holders 35 carries a diaphragm 10', then the turntable 35 is moved to bring one of the work holders in proper relation with respect to the blade holder, at 31, the turntable being moved for this purpose until the pin 43 may engage one of the openings 42. Then the brake is released and the work holder is turned to aline the first groove with the blade carried by the blade holder, at 31, and the latter is lowered to cause the lower end of a blade to engage in the groove. With the brake released, the work holder is given final angular adjustment to assure contact of one side of the blade with one side of the groove, a recess being left between the other side of the blade and the other side of the groove. The recess is filled with weld metal, secured, for example, from an electric arc weld rod 55; and, when the recess is completely filled, the blade holder and the indexing pin 43 are both raised and the second work holder is brought into position with respect to the blade holder. As soon as the first work holder reaches the machining location, the milling cutter, at 32, is lowered for the purpose of removing surplus weld metal With the first blade welded in the first groove of each diaphragm and surplus weld metal removed, the first diaphragm returns to the blade assembling and welding location and is angularly adjusted to bring the second groove into proper relation, as before, and the operations indicated are repeated. Thus, it will be seen that the blades are welded, one at a time, to the diaphragm members in succession, the welding being followed by removal of surplus weld metal, and the welding and machining operations occur at the forward side in the direction of blade assembly so that adequate room exists for such operations.

Reference has already been made to raising and lowering of the blade holder and the cutter incident to blade assembly and machining. The devices are raised so as not to interfere with indexing movement and they are lowered incident to the assembly and machining operations.

The blade holder, at 31, may be of any suitable type. For example, I show the holder comprised by a guide 56 formed in the outer end of the arm 39 and by a slide 57 fitting the guide, the slide being arranged to receive a blade. With the slide in upper position and a blade inserted, it is in condition to be lowered for insertion of a blade in a groove.

Likewise, the cutter, at 32, may be raised and lowered in any suitable manner. By way of example, there is shown, a rotary cutter 60 carried by the lower end of the shaft 61 mounted in the body 62 carried by the arm 40 and raised and lowered by rack and pinion mechanism 63 actuated by the lever 64.

The operation of the apparatus illustrated is as follows:

Each of the work holders 33 has a disk member 10' provided with grooves 13' extending across the periphery thereof and mounted thereon so as to be concentric with its arbor. With a blade 14 fastened in the blade holder, at 31, and with the turntable held in one of its positions by the indexing device, the brake of the work holder adjacent to the blade holder is released in order that the first groove or slot 13' of the disk member may be approximately alined with the blade 14 carried by the blade holder. Thereupon, the blade holder is lowered to insert the lower end of the blade in the first groove 13' and, with the brake released, the work holder is turned sufficiently to secure abutment of the convex side of the blade with the concave side of the slot, the slot having greater circumferential extent than the blade so that a recess is left between the concave side of the blade and the convex side of the slot for the reception of weld metal. With the blade and slot surfaces contacting, the brake is allowed to reengage so as to secure the work holder in fixed relation with respect to the turntable or cage. Thereupon, the recess is filled with weld metal, an electric weld rod 55 being conveniently used for this purpose. After welding, in the first position, the indexing pin 43 is released so that the turntable may be advanced to bring the next work holder into the first or welding position, the first work holder having been advanced to a second position. Since, with the apparatus shown, there are four work holders spaced 90° apart, the cutting device, at 32, is preferably located at the third position, this location providing adequate time for the weld to cool, no work in connection therewith being carried on in the second position. With a weld in the third position, the cutting device, at 32, is lowered to bring the circular cutter, conforming closely to the concavity of the blade, into engagement with the weld so as to substantially remove all of the weld metal extending beyond the periphery of the disk member and laterally of the blade. From the third position, a work holder advances to the fourth position, where any metal not conveniently removed by the cutting device is removed in any suitable manner. In other words, after completion of welding in the first position, the weld moves progressively through second, third, and fourth positions, cooling occurring during the transit from the first to the third positions and removal of surplus metal taking place at the third and fourth positions, the removal of surplus metal being carried on to such a point that substantially smooth surfaces are provided to define the flow passages between the blades. Each work holder moves from the fourth or finishing position to the first position, whereupon its brake is released to permit of its arbor being adjusted angularly to aline approximately the next blade groove with the blade holder, the latter then being lowered to insert a blade in the groove and finally angular adjustment of the arbor being made so as to secure contact of the convex blade side with the concave side of the groove and then the brake is reengaged, the succeeding operations proceeding as already described. Thus, it will be seen that I provide for the assembling and welding of blades one at a time to a plurality of disk members in succession, the disk members being carried by work holders movable to welding and metal cutting positions, as indicated, the indexing device assuring that, with proper adjustment for the welding position, a weld will be in proper position to be trimmed or machined when the work holder reaches the weld trimming or cutting position, the reason for this being that, when the brake is reengaged, the work holder arbor is secured in fixed relation with respect to the turntable, the indexing device then assuring of equal increments of angular movement such that a weld will be properly located in the cutting position. As the turntable is moved step by step, it is necessary to elevate the blade holder and the cutting device to clear the tips of the blades, such devices being lowered incident to blade assembly and to trimming or cutting of excess weld metal.

While I have shown my invention in several forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. In apparatus providing for attachment of blades, one at a time, to a plurality of arcuate members, in succession, a plurality of work holders carrying arcuate members, means providing for movement of the work holders in a circuit, means providing for attachment of blades to the arcuate members, means for holding the work holders in predetermined relation with respect to the last-mentioned means, means providing for angular adjustment to any desired extent of each work holder about an axis coaxial with that of the arcuate member carried thereby, and means for normally holding each workholder in angularly adjusted position with respect to its axis and releasable so that its arcuate member may be adjusted angularly for blade attachment.

2. In apparatus providing for attachment of blades, one at a time, to a plurality of arcuate members in succession, a plurality of work holders carrying arcuate members, means providing for movement of the work holders in a circuit, means providing for attachment of blades to the arcuate members such that each attachment involves operations at different positions in said circuit, means for holding the work holders in predetermined relation with respect to said different positions, means providing for angular adjustment to any desired extent of each workholder about an axis coaxial with that of the arcuate member carried thereby, and means normally holding each workholder in angularly adjusted position with respect to said axis and releasable so that its arcuate member may be angularly adjusted for blade attachment.

3. In apparatus for attachment of blades, one at a time, to a plurality of disk members in succession, a vertical post, a horizontal turntable journaled about said post, a plurality of work holders carried by the turntable and being adjustable about axes extending radially of the post and which are equi-distantly spaced angularly, means carried by the post and providing for attachment of blades to the disk members, means for holding the turntable against angular movement so as to position the work holders in predetermined relation with respect to the last-named means, and means normally holding each workholder in position angularly with respect to its axis extending radially of the post and releasable in order that its disk member may be angularly adjusted for blade attachment.

4. In apparatus providing for attachment of blades, one at a time, to a plurality of disk members in succession, a vertical post, a horizontal turntable journaled about said post, a plurality of work holders carrying disk members and mounted on the turntable, said work holders being adjustable about axes extending radially of the post and equi-distantly spaced angularly, means providing for attachment of blades to the disk members such that each attachment involves operations at different angular positions with respect to said post and corresponding to the angular spacing of the work holders, means for holding the turntable against angular movement so that work holders will be in predetermined relation with respect to said predetermined positions, and means for normally holding each workholder in any desired angular position with respect to its axis extending radially of the post and releasable so that the workholder may be adjusted angularly with respect to said axis suitably for the initial and succeeding positions of blade attachment.

5. In apparatus providing for attachment of blades, one at a time, to a plurality of disk members in succession, a vertical post, a horizontal turntable journaled about said post, said turntable having depending and upwardly-extending flanges, a plurality of work holders equi-distantly spaced angularly about the post and carrying disk members and having spindles journaled in said depending flange, the axes of said spindles extending radially of the post, means providing for attachment of blades to the disk members such that each attachment involves operations at different angular positions determined by the angular spacing of the work holders and including supporting radial arms fixedly secured to the post above the turntable, an index plate carried by the upwardly-extending flange of the turntable and having predetermined indexing positions, means carried by the post for engagement with the index plate to hold the latter and the turntable in predetermined angular positions, a brake for each work holder carried by said depending flange, a spring for each brake and normally maintaining the latter effective, and treadles for releasing the respective brakes and carried by the depending flange.

6. A machine for attaching blades to a plurality of disk members comprising a turntable, a plurality of work holders carried by the turntable and spaced equi-distantly, means for indexing the turntable so that each work holder may be retained in a first position while another work holder is in a second position, means for holding a blade in proper relation to a disk member carried by a work holder in the first position for welding the blade to said disk member, means for holding a cutting device in proper relation to a disk member carried by a work holder in said second position for removing surplus weld material resulting from the welding effected in the first position, means providing for angular adjustment to any desired extent of each workholder about an axis extending radially of the turntable axis, and means for normally holding each work holder against movement about its axis and releasable so that it may be angularly adjusted to position properly the disk member carried thereby for blade attachment.

7. In apparatus providing for the attachment of blades, one at a time, to a plurality of disk members in succession, a blade holder, a metal trimming device, a circular series of equi-distantly spaced work holders carrying disk members, means providing for angular adjustment of each work holder so that, with a blade brought into proper relation with respect to the disk member by the blade holder, the disk member may be angularly adjusted to proper position relatively to the blade so that the latter may be welded to the disk member, means for locking each work worker in angularly adjusted position, the spacing of the blade holder and the trimming device having such relation to the spacing of the work holders that when one disk member is adjusted and locked for welding another locked disk member will be in proper relation to the trimming device for removal of surplus weld metal, and means providing for raising and lowering of the blade holder and the trimming device incident to welding of blades to the disk members and removal of surplus weld metal.

8. In apparatus for the attachment of blades, one at a time, to a plurality of disk members in succession, a blade holder, a rotary trimming device, a circular series of equi-distantly spaced work holders carrying disk members, the spacing of the work holders having such relation with respect to the spacing of the blade holder and the trimming device that the same region of a disk member may be brought successively into proper relation with respect to the blade holder and the trimming device, means providing for movement of the work holders in series and for locking them in proper relative position to the blade holder and the trimming device, means providing for operation of the blade holder to lower a blade into position with respect to a disk member, means providing for angular adjustment of each disk member with respect to a lowered blade so that the blade and the disk member will be properly positioned for welding, means for locking each disk member in angularly adjusted position so that the positioned blade and disk member may be welded together and so that the disk member will be in proper position for removal of surplus weld metal when later brought into relation with respect to the trimming device, and means providing for raising and lowering of the trimming device incident to removal of surplus weld metal.

9. In a machine for attaching blades one at a time to a plurality of disk members in succession, a fixed support, a blade assembling device carried by the support, a cutting device carried by the support, a cage, a plurality of work holders carried by the cage, means providing for angular movement of the cage so that disk members carried by the work holders may be brought into contiguous relation with respect to said devices, means for locking the cage in a predetermined number of angular positions relatively to said devices so that the work holders may be maintained in predetermined positions relatively to the latter, and means providing for angular adjustment of each work holder so that a disk member may be properly positioned with respect to the blade assembling device incident to welding of a blade to the disk and, upon advancement of the cage to another locked position, the weld is properly positioned with respect to the cutting device for removal of excess weld metal.

10. In a machine for attaching blades, one at a time, to a plurality of disk members in succession, a fixed support including a vertical center post having a journal portion, radial arms connected to the center post above the journal portion and spaced angularly one from the other, a blade assembling device carried by one of the arms, a cutting device carried by the other arm, a turntable having a central bearing fitting the journal portion, a plurality of work holders including arbors journaled in the turntable and having their axes extending radially with respect to the axis of the center post journal portion, said work holders being spaced angularly so that when one is beneath the assembling device another is beneath the cutting device, means for locking the turntable in predetermined positions relatively to the support such that each work holder may be locked below each of said devices and in each locked position one work holder is below the assembling device and another is below the cutting device, frictional means normally holding the arbor of each work holder fixed with respect to the turntable, means for releasing each frictional means so that a disk element carried by the work holder may be properly positioned with respect to the blade assembling device whereupon the frictional means is allowed to reengage so that the disk member may be held incident to welding a blade thereto and so that, upon advancement of the turntable to another locked position, the weld will be in proper position for removal of excess weld metal by the cutting device.

11. In a machine for attaching blades, one at a time, to a plurality of disk members in succession, a fixed support including a vertical center post having a journal portion and an upwardly-facing abutment below the journal portion, radial arms connected to the center post above the journal portion and spaced angularly one from the other, a blade assembling device carried by one of the arms, a cutting device carried by the other arm, a turntable having a central bearing fitting the journal portion, a thrust bearing between the turntable and the abutment, a plurality of work holders including arbors journaled to the turntable and having their axes extending radially with respect to the vertical axis of the center post journal portion, said work holders being spaced angularly so that when one is beneath the assembling device another is beneath the cutting device, means for locking the turntable in predetermined positions relatively to the support such that each work holder may be locked below each of said devices and in each locked position one work holder is below the assembling device and another is below the cutting device, frictional means normally holding the arbor of each work holder fixed with respect to the turntable, means for releasing each frictional means so that disk member carried by a work holder may be properly positioned with respect to the blade assembling device whereupon the frictional means is allowed to reengage so that the disk member may be held incident to welding a blade thereto and so that, upon advancement of the turntable to another locked position, the weld will be in proper position for removal of excess weld metal by the cutting device.

12. In a machine for attaching blades, one at a time, to a plurality of disk members in succession, a fixed support including a vertical center post having a journal portion, radial arms connected to the center post above the journal portion and spaced angularly one from the other, a vertically movable blade assembling device carried by the outer end of one of the arms, a vertically movable cutting device carried by the other arm, a turntable having a central bearing fitting the journal portion, a plurality of work holders including arbors journaled to the turntable and having their axes extending radially with respect to the vertical axis of the central post journal portion, said work holders being spaced angularly so that when one is beneath the assembling device another is beneath the cutting device, means for locking the turntable in predetermined positions relatively to the support so that each work holder may be locked below each of said devices and in each locked position of the turntable one work holder is below the assembling device and another is below the cutting device, frictional means normally holding the arbor of each work holder fixed with respect to the turntable, means for releasing each frictional means so that a disk member carried by a work holder may be properly positioned with respect to the blade assembling device whereupon the frictional means is allowed to reengage so that the disk member may be held incident to welding a blade thereto and so that, upon advancement of the turntable to another locked position, the weld will be in position for removal of excess weld metal by the cutting device and means for lowering the blade assembling and the cutting devices to operative positions contiguous to the periphery of the disk member and for raising such devices to positions to clear the blades sufficiently to permit movement of the turntable.

13. In apparatus providing for attachment of blades, one at a time, to a plurality of disk members in succession; a center post; a turntable journaled about said center post; a plurality of work holders carrying disk members and equidistantly spaced angularly with respect to the center post; each work holder including an arbor journaled to the turntable about an axis extending radially of the center post, a face plate attached to the outer end of the arbor and having an abutment surface arranged normally with respect to the arbor axis, and means for clamping a disk member in place with respect to said abutment surface; means providing for attachment of blades to the disk members such that each attachment involves operations at different and predetermined angular positions with respect to said center post and corresponding to the spacing of the work holders; means for holding the turntable against angular movement with work holders disposed at said predetermined positions; and means for normally holding each work holder in position angularly with respect to the axis of its arbor and releasable so that it may be angularly adjustable suitably for the initial and succeeding positions of blade attachment.

14. In apparatus providing for attachment of blades, one at a time, to a plurality of disk members in succession, a center post; a turntable journaled about said center post; a plurality of work holders carrying disk members; each work holder including an arbor journaled to the turntable about an axis extending radially of the center post, a face plate attached to the outer end of the arbor and having an abutment surface arranged normally with respect to the arbor axis, and means for clamping a disk member in place with respect to the abutment surface; means providing for the attachment of blades to the disk members such that each attachment involves operations at different angular positions of the work holders with respect to the center post axis; and brake mechanisms carried by the turntable and cooperating with the respective work holders for holding the latter in fixed positions angularly with respect to the arbor axes and releasable so that each work holder may be angularly adjusted suitably for blade attachment.

ARTHUR R. ALLARD.